US009193507B2

(12) United States Patent
Aljajawi et al.

(10) Patent No.: US 9,193,507 B2
(45) Date of Patent: Nov. 24, 2015

(54) VEHICLE RESERVOIR CAP WITH PRESSURE ACTUATED VALVE

(71) Applicants: Joseph E Aljajawi, Troy, MI (US); Bruce D Kocer, Ortonville, MI (US); Brett M Swiss, Utica, MI (US)

(72) Inventors: Joseph E Aljajawi, Troy, MI (US); Bruce D Kocer, Ortonville, MI (US); Brett M Swiss, Utica, MI (US)

(73) Assignee: FCA US LLC, Auburn Hills, MI (US)

( * ) Notice: Subject to any disclaimer, the term of this patent is extended or adjusted under 35 U.S.C. 154(b) by 85 days.

(21) Appl. No.: 14/132,905

(22) Filed: Dec. 18, 2013

(65) Prior Publication Data

US 2015/0166228 A1     Jun. 18, 2015

(51) Int. Cl.
*B65D 51/16*    (2006.01)
*F16K 31/12*    (2006.01)

(52) U.S. Cl.
CPC ............... *B65D 51/16* (2013.01); *F16K 31/12* (2013.01)

(58) Field of Classification Search
CPC . B60K 15/0406; F01P 11/0238; F16K 31/12; B65D 51/16
USPC .................. 220/288, 203.28, 203.24, 203.23, 220/203.19, 295, 293; 251/58, 74, 120
See application file for complete search history.

(56) References Cited

U.S. PATENT DOCUMENTS

| 2,133,575 | A | * | 10/1938 | Rosenberg | ................. 137/493.2 |
| 3,831,801 | A | | 8/1974 | Rodgers | |
| 4,040,404 | A | | 8/1977 | Tagawa | |
| 5,188,140 | A | | 2/1993 | Kosaka | |
| 6,390,318 | B1 | * | 5/2002 | Tanaka et al. | ............ 220/203.26 |

FOREIGN PATENT DOCUMENTS

FR              967570 A    * 11/1950   ............. B65D 51/16

* cited by examiner

*Primary Examiner* — Robert J Hicks
(74) *Attorney, Agent, or Firm* — Ralph E. Smith

(57) ABSTRACT

In at least one implementation, a cap for a vehicle fluid reservoir includes a valve having a first valve portion that includes a valve passage closed by engagement of at least two portions of the valve with each other and opened when at least two portions of the valve are separated from each other to control fluid flow through the valve in a first direction and a second valve portion that controls fluid flow through the valve in a second direction different than the first direction. The second valve portion includes a flange engageable with the valve seat to selectively permit fluid flow between the flange and the valve seat and a biasing member received within the chamber and providing a force on the valve to yieldably bias the flange into engagement with the valve seat.

16 Claims, 4 Drawing Sheets

VEHICLE RESERVOIR CAP WITH PRESSURE ACTUATED VALVE

FIELD

The present disclosure relates to a cap for a vehicle fluid reservoir, where the cap includes one or more pressure actuated valves that selectively permit fluid flow therethrough.

BACKGROUND

Many vehicles include fluid systems that include a reservoir that contains a reserve volume of fluid to maintain a desired fluid level in the fluid system. The reservoirs typically include an opening or fill spout through which extra fluid may be added, and those openings are closed by a cap. Some fluid systems, for example hydraulic fluid systems such as may be used with power steering systems, are desirably maintained under some pressure. In such systems, the reservoirs and/or cap may be vented or have other valve arrangements to maintain the pressure in the reservoir and fluid system, and/or to avoid an unduly high pressure therein.

SUMMARY

In at least one implementation, a cap for a vehicle fluid reservoir has a first cap body and a second cap body coupled to the first cap body to define a chamber between them. At least one of the first cap body or the second cap body includes a passage that communicates with the chamber and a valve seat surrounding the passage. A valve is located in the chamber and in communication with the passage, and includes a first valve portion that includes a valve passage closed by engagement of at least two portions of the valve with each other and opened when at least two portions of the valve are separated from each other to control fluid flow through the valve in a first direction and a second valve portion that controls fluid flow through the valve in a second direction different than the first direction. The second valve portion includes a flange engageable with the valve seat to selectively permit fluid flow between the flange and the valve seat and a biasing member received within the chamber and providing a force on the valve to yieldably bias the flange into engagement with the valve seat. At least some implementations may also include a retainer that has an end wall engaged with the flange on one side and with the spring on its other side to transmit the spring force to the flange.

In at least some implementations, both the first and second valve portions are pressure actuated and permit fluid flow therethrough when a sufficient pressure differential exists across the valve. In one direction, the force of the spring may be chosen to provide a desired operating pressure in a reservoir. That is, the spring may be chosen to provide a force on the valve that ensures that the valve does not permit fluid flow out of the reservoir until a desired threshold pressure is exceeded in the reservoir. This provides a desired pressure within the reservoir but prevents an overpressure condition. Should the pressure within the reservoir fall below a desired minimum, the valve may permit fluid flow into the reservoir to increase the pressure therein.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
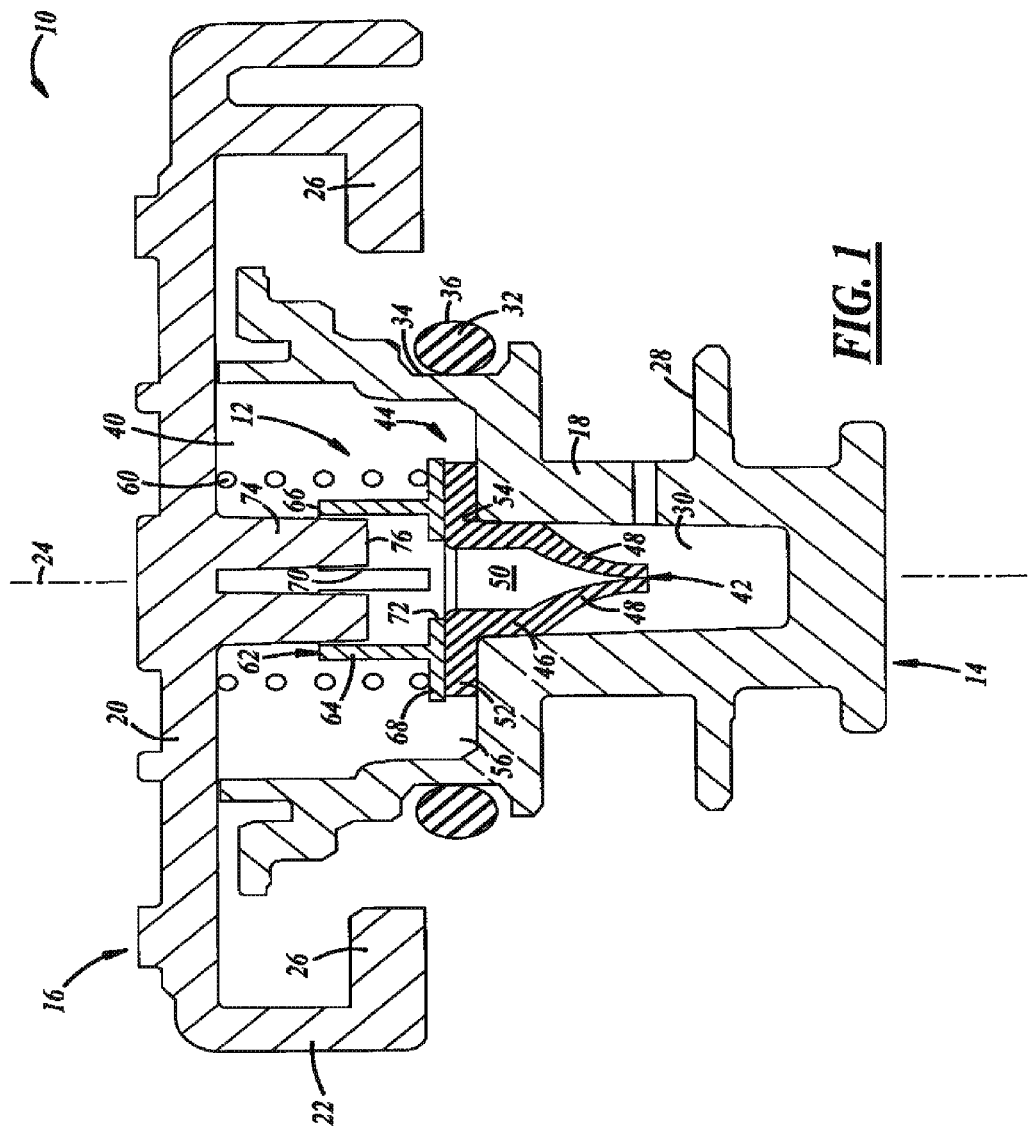
FIG. 1 is a sectional view of a vented reservoir cap.
Figure 2:
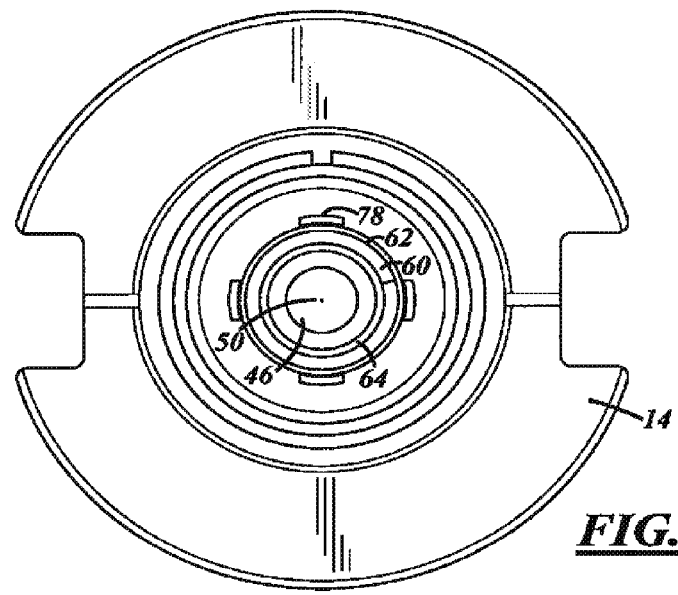
FIG. 2 is a bottom view of a first portion of the reservoir cap a valve body, and a biasing member.
Figure 3:
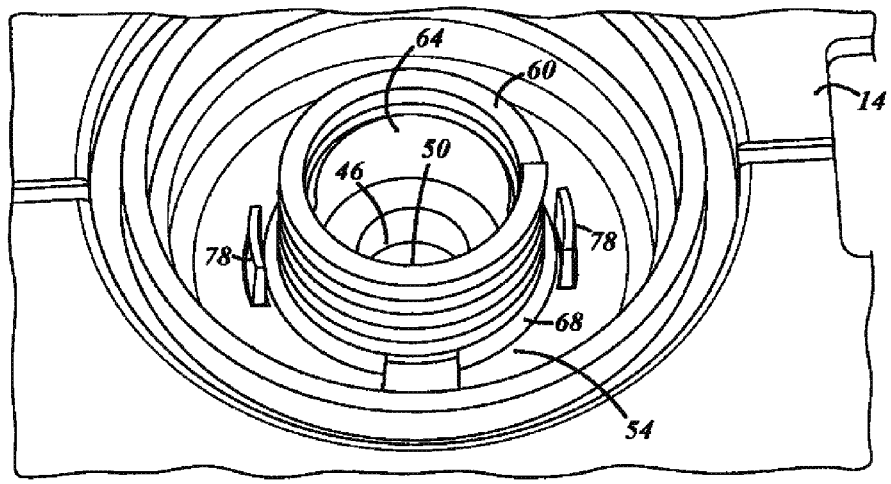
FIG. 3 is an enlarged, fragmentary bottom perspective view of the first portion showing the biasing member acting on a retainer.
Figure 4:
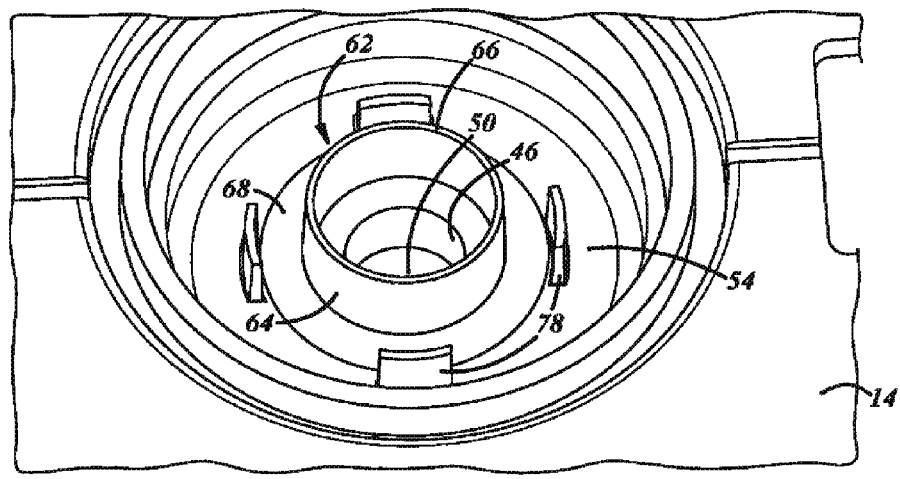
FIG. 4 is similar to FIG. 3 except the spring is removed to better show the retainer.

Referring in more detail to the drawings, FIG. 1 illustrates a cap 10 for a vehicle fluid reservoir that includes one or more valves 12 that permit gaseous flow therethrough. The gaseous flow may occur through the cap and into and/or out of the reservoir and facilitate venting and/or pressure regulation of the reservoir. In at least some implementations, flow may occur both into and out of the reservoir. The cap 10 may be used, for example, with various hydraulic reservoirs that are under some pressure such as, but not limited to, a power steering fluid reservoir.

As shown in FIG. 1, the cap 10 includes first and second bodies 14, 16 that are coupled together (either directly or by one or more other structures or components) to define a unitary cap. The first body 14 may define an inner cap portion and may include a central portion 18 adapted to be received within an opening of the reservoir which may be defined by an open end of a fill spout through which fluid is added to the reservoir. The second body 16 may define an outer cap portion and include an outer wall 20 adapted to overlie the first body 14 and the opening in the reservoir, and a circumferential skirt 22 that facilitates manually grasping and turning the cap 10 relative to the reservoir. For ease of description, the inner and outer cap portions will hereafter be called the inner cap 14 and outer cap 16 and collectively these portions will be called the cap 10. Further, the terms circumferential, radial and axial relate to a center axis 24 of the cap 10. The inner cap 14 and outer cap 16 may be snap-fit, press-fit, glued, welded, heat staked, threaded together or otherwise connected together in assembly to define a unitary cap 10 that is used as a single component to close an opening in the reservoir.

One or both of the inner and outer cap 14, 16 may include one or more features adapted to secure the cap to the reservoir, such as features that interact with threads, lugs and/or beads provided on the reservoir. As shown, the skirt 22 includes an inwardly extending flange 26 that is adapted to overlie a bead or thread of the reservoir to retain the cap on the reservoir. The inner cap 14 may include one or more radially outwardly extending flanges 28 that facilitate alignment of the cap 10 with the reservoir opening and/or provide a shield against splashing or sloshing fluid, to inhibit such fluid from entering a passage 30 of the inner cap. One or more seals, such as o-rings may be carried by the cap 10 or reservoir to provide a fluid tight seal between the cap and reservoir when the cap is installed on the reservoir. As shown, one seal 32 is received in a groove 34 of the inner cap 14 and has an outer surface 36 exposed and adapted to engage a surface of the reservoir such as an inside surface of a reservoir fill spout. The seal 32 may be axially spaced from the outer cap flange 26.

A chamber 40 is defined between the inner and outer caps 14, 16 and that chamber is communicated with the reservoir via the passage 30 in the inner cap 14. The valve 12 is received within the chamber 40 and includes two valve portions 42, 44. A first valve portion 42 defines a check valve that permits fluid flow into the reservoir but prevents the reverse flow. A second valve portion 44 defines a check valve that permits fluid flow through the valve 12 from the passage 30.

As shown and in at least some implementations, the first and second valve portions 42, 44 are defined in the same valve body 46, as separate features in the same piece of material. In this implementation, the first valve portion 42 is a duck-bill valve having adjacent sidewall portions 48 engaged with each other in a closed position and defining when open a flow path leading to an internal valve passage 50 between at least two sidewall portions 48 to allow fluid flow therethrough. The flow path is normally closed by engagement of the adjacent sidewall portions 48 and selectively opened when a pressure within the passage 30 is greater than the force/pressure tending to keep the sidewall portions engaged with each other. The second valve portion 44, in this example, is defined by an outwardly (e.g. radially) extending flange 52 that engages a valve seat 54 defined in the inner cap 14 surrounding the passage 30. Fluid flow through the valve seat 54 is prevented when the flange 52 is engaged with the valve seat 54 and permitted when at least a portion of the flange is displaced from the valve seat. The flange 52 is displaced from the valve seat 54 when the force acting on the reservoir side of the valve body 46 is greater than the force acting on the opposite side.

The flange 52 may be generally planar, circumferentially continuous and sized to overlap the valve seat 54 to close the passage 30 at the valve seat when engaged therewith. A gap 56 may be provided around at least a portion of the periphery of the flange 52 so that fluid flow occurs around the flange when at least a portion of the flange is removed or spaced from the valve seat 54. In at least some implementations, the entire flange 52 may also be movable relative to the inner cap 14 and outer cap 16 between open and closed positions rather than having a portion of the flange 52 held in place and a separate flange portion movable relative thereto (although this may be done in some implementations). The valve body 46 may be formed of a flexible and resilient material, such as an elastomer or other polymer suitable for use with the fluid in the reservoir.

To control the force/pressure at which the flange 52 is displaced from the valve seat, a biasing member 60 may be provided. The biasing member 60 yieldably biases the flange 52 into engagement with the valve seat 54 and is shown as a coil spring 60 although other resilient components may be used. Hence, pressure from the reservoir acts on one side of the valve body 46 and the other side of the valve body is acted on by pressure in the chamber 40 and the force of the spring 60. In this way, a pressure within the reservoir can be controlled as a function of the spring force.

In at least some implementations, a retainer 62 is disposed between the spring 60 and the valve body 46. As shown, the retainer 62 includes a sidewall 64 open at a first end 66 and terminating at an end wall 68 at its other end. The sidewall 64 may be tubular and circumferentially continuous or formed in segments with a gap 70 between segments. An opening 72 through the end wall 68 permits fluid to flow through the first valve portion 42 and through the retainer 62 into the chamber 40 when the first valve portion 42 is open. The end wall 68 overlaps and is engaged with at least a portion of the valve flange 52, and is shown overlapping the entire flange 52 from at least the valve seat 54 and outboard of the valve seat. One end of the spring 60 engages the end wall 68 and presses the end wall into engagement with the valve flange 52. The end wall surface that engages the flange 52 may be planar to more evenly distribute the spring force to the flange. The retainer 62 may be formed from a single piece of material, or multiple pieces. In one form, the retainer sidewall 64 is formed from a metal material and the end wall 68 is formed from a softer material, for example, an elastomer or suitable plastic.

To control and/or limit the valve body 46 movement relative to the valve seat 54, the outer cap 16 may include a projection 74 extending into the chamber 40 and toward the valve seat 54. The projection 74 is received within the retainer sidewall 64 at least during a portion of the movement of the valve body 46 away from the valve seat 54. The projection 74 may be sized to limit skewing of the retainer 62 and provide substantially linear movement of the retainer relative to the projection. The projection 74 may also act, in addition to the retainer sidewall 64, to retain the position of the spring 60 in assembly. To limit the extent to which the valve body 46 may move away from the valve seat 54, the retainer 62 and/or valve body 46 may engage a stop surface. In the implementation shown, the retainer end wall 68 engages a free end 76 of the projection 74 to limit valve body travel. This helps retain the valve body 46 aligned with the valve seat 54. To further guide movement of the valve body 46, one or more guides may be provided laterally or radially spaced from the periphery of the flange and retainer end wall. In the implementation shown, the guides include posts 78 that extend from the inner cap 14 into the chamber 40. At least when the posts 78 are provided, a larger gap may be provided between the projection 70 and retainer sidewall 64 to reduce friction or other interference with the movement of the valve body 46 relative to the valve seat 54.

Figure 5:
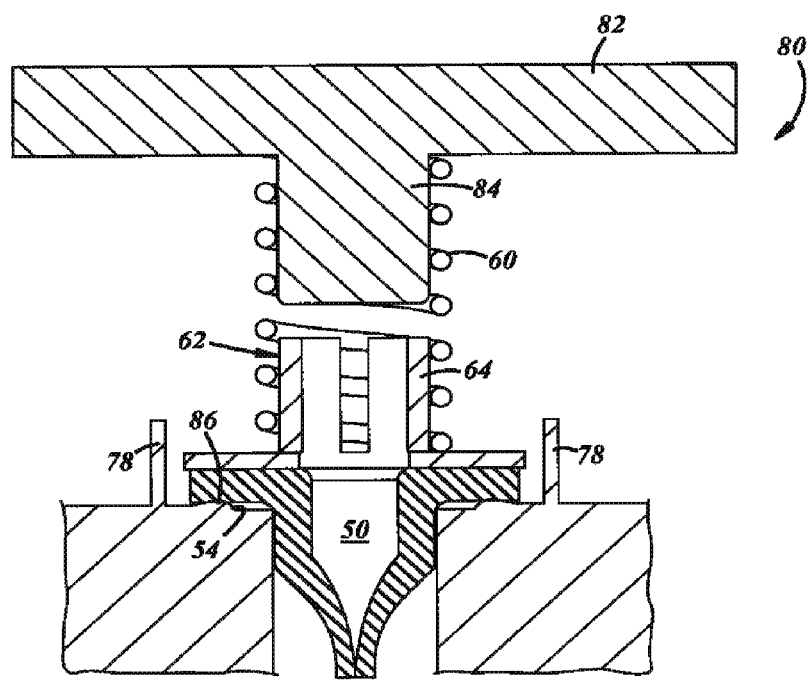
FIG. 5 is a fragmentary sectional view of an alternate reservoir cap.

The posts 78 may also be of more use in an embodiment of a cap 80 like that shown in FIG. 5. In this embodiment, at least some of the components may be similar to components in the embodiment of FIGS. 1-4 and to facilitate description of the cap 80, some of the same terms and reference numbers will be used. In the cap 80, an outer cap 82 includes a projection 84 that is axially or longitudinally spaced from and not received within the sidewall 64 of the retainer 62. In this example, the posts 78 may provide the primary guidance of the valve body 46 as it moves and the projection 84 serves to provide a stop surface that limits the amount that the valve body 46 may move away from the valve seat 54 and also retain an end of the spring 60. As also shown in FIG. 5, the valve seat 54 may be defined by or include a raised rib 86. The rib 86 may improve the seal between the valve flange 52 and valve seat 54 by concentrating on a smaller surface area the force ending to engage the flange with the valve seat. This may enable greater control of the pressure needed to displace the valve flange 52 relative to the valve seat 54 to open the second valve portion 44. In addition or instead, the valve flange 52 may include a rib adapted to engage and seal against the rib 86, valve seat 54 or some other surface or object.

Figure 6:
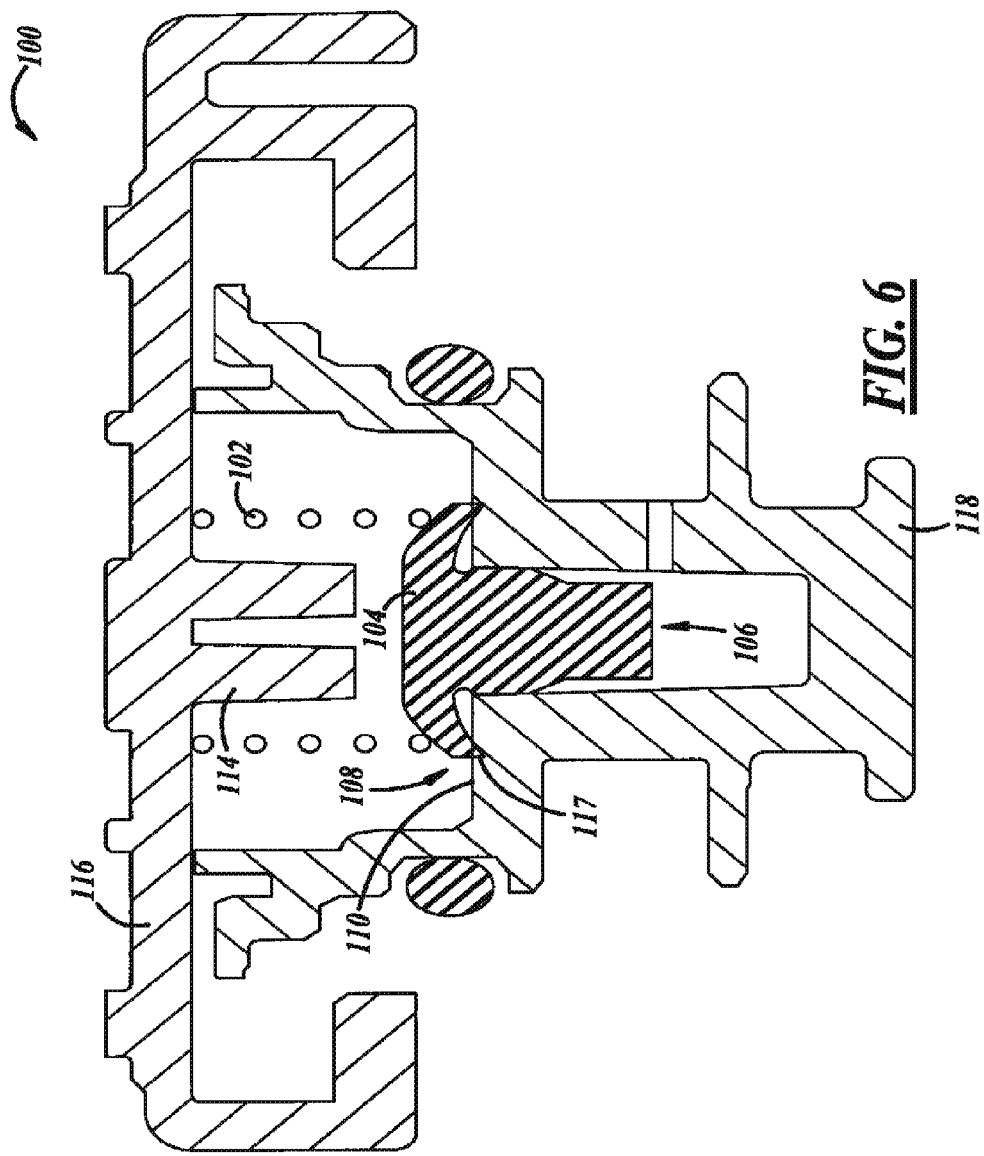
FIG. 6 is a sectional view of an alternate reservoir cap.

FIG. 6 illustrates a cap 100 wherein a biasing member 102 acts directly on a valve body 104 without any intervening retainer. The valve body 104 may be the same as the valve body 46 previously described and include two valve portions 106, 108 each controlling flow in a different direction (e.g. into and out of the reservoir), if desired. In FIG. 6, the passage through the valve body 104 is not shown, but may be provided to permit flow therethrough into the reservoir when the first valve portion 106 is open, as previously described. In this example, the spring 102 holds the second valve portion 108 against the valve seat 110 by directly engaging a valve flange 112 that overlies the valve seat 110. A projection 114 from the outer cap 116 may be provided in the area of the valve body 104 to, for example, limit movement of the valve body away from the valve seat 110. The projection 114 may also help to retain the spring 102, as previously described. To improve the seal provided thereby, the periphery of the flange 112 may be received in a groove 117 formed in the inner cap 118, outboard of the valve seat 110, if desired. The flange 112 may also simply engage the inner cap 118 at and/or outboard of the valve seat 110 without any groove 114. Or, the valve seat may include or be defined by an upwardly projecting rim may be provided, as in the example shown in FIG. 5. The cap 100 may otherwise be constructed like the cap 10 shown in FIG. 1, or as otherwise desired.

In use, the cap 10, 80, 100 closes an opening of a reservoir, such as an open end of a fill spout for a power steering fluid reservoir. In at least some implementations, the cap 10, 80, 100 is aligned with the spout and the end of the spout is received between the seal 32 and the outer cap flange 26. The cap 10, 80, 100 is then rotated relative to lugs or threads on the reservoir fill spout to releasably retain the cap on the spout. The seal 32 is received against an inside surface of the spout and the outer cap flange 26 engages the outside of the spout. An inwardly facing surface of the outer cap wall 20 may also engage the upper, open end of the spout. The passage 30 in the cap 10, 80, 100 opens into the reservoir below the seal 32 so that the passage 30 and valve 12 are communicated with the interior of the fluid reservoir and the pressure therein.

It may be desirable, in at least certain implementations, to maintain an at least somewhat consistent positive pressure in the reservoir. Doing so may, among other things, prevent foaming of the fluid and facilitate steady operation of components with which the fluid is used. Too much pressure can cause other issues, like unintended actuation of components with which the fluid is used. Accordingly the cap 10, 80, 100 facilitates maintaining some but not too much pressure in the fluid reservoir. The spring 60, 102 acting on the valve body 46, 104 can be chosen/calibrated to provide a desired force on the valve body to ensure that the valve body flange 52, 112 remains against the valve seat 54, 110 until a desired pressure limit in the reservoir is exceeded, and then, in at least some implementations, the entire valve body 46, 104 may move relative to the valve seat to open the second valve portion 44, 108 and permit fluid flow through the second valve portion/valve seat. In at least some power steering fluid systems, the pressure may be about 5 to 10 psi, although other pressure values may be achieved, as desired. Due to tolerances in manufactured parts, the actual pressure at which the valve body 46, 104 of the cap 10, 80, 100 is displaced from the valve seat 54, 110 may change from part-to-part in production. However, the variation in spring force over the tolerance range of the cap features is generally small and so the pressure variation for the valve actuation will also be small, such as on the order of 2 psi. In a cap where a fixed structure engages the valve to close the second valve portion, and hence, only a portion of the valve moves to open the second valve portion, tolerances in the part can more significantly affect the operating pressure and in some cases may permit a variation of 5 to 10 psi which is not desirable in some applications.

Further, use of the retainer 62 that is engaged by the spring 60 and held against the valve flange 52 provides a more even force on the flange and results in a more uniform lifting or displacement of the valve flange relative to the valve seat 54 instead of only a small portion of the flange periphery moving from the valve seat while the remainder of the valve flange remains closed on the valve seat. This further provides more uniform pressure regulation within a particular cap as well as throughout a production run of caps.

In at least some implementations, both the first valve portion 42, 106 and second valve portion 44, 108 are moved from closed to open positions by pressure differentials on opposed sides of the valve body 46, 104. In this way, the first valve portion remains closed when the second valve portion is open, and vice versa. Accordingly, even though they may be connected together, and even formed from the same piece of material, the first and second valve portions may operate somewhat independently from each other.

While the caps 10, 80, 100 shown have a spring 60, 102 surrounding a projection 74, 84, 114 and/or a spring retainer 62, these features could be larger in size/diameter and hollow such that the spring could be received within such features. Likewise, while the retainer sidewall 64 is shown as being larger in size/diameter and received around the projection 74, the projection could be annular and adapted to receive the retainer sidewall therein. In other words, the spring, projection and retainer sidewall may be at least partially overlapped (e.g. axially overlapped) in different configurations, as desired, with different components surrounding other components in different embodiments, as desired.

What is claimed is:

1. A cap for a vehicle fluid reservoir, comprising:
a first cap body and a second cap body coupled to the first cap body to define a chamber between them, wherein at least one of the first cap body or the second cap body includes a passage that communicates with the chamber and a valve seat surrounding the passage;
a valve located in the chamber and in communication with the passage, the valve including a first valve portion that includes a valve passage closed by engagement of at least two portions of the valve with each other and opened when at least two portions of the valve are separated from each other to control fluid flow through the valve in a first direction and a second valve portion that controls fluid flow through the valve in a second direction different than the first direction, the second valve portion including a flange engageable with the valve seat to selectively permit fluid flow between the flange and the valve seat; and
a biasing member received within the chamber and providing a force on the valve to yieldably bias the flange into engagement with the valve seat.

2. The cap of claim 1 wherein the valve seat is defined in the first cap body and the second cap body includes a projection extending into the chamber toward the valve seat to limit the extent to which the valve moves away from the valve seat.

3. The cap of claim 2 which also includes a retainer having an end wall received between the biasing member and the flange to transmit the biasing member force onto the flange and a sidewall extending from the end wall, wherein the sidewall and projection overlap during at least a portion of the range of motion of the valve relative to the valve seat.

4. The cap of claim 1 wherein the valve seat is defined at least in part by a raised rib that surrounds the valve seat and is engageable by the flange.

5. The cap of claim 1 wherein the valve seat is defined at least in part by a groove formed in the first cap body surrounding the valve seat.

6. The cap of claim 2 wherein the projection and a portion of the biasing member are overlapped to retain one end of the biasing member.

7. The cap of claim 1 wherein a gap is provided adjacent to the periphery of the flange so that fluid may flow around the flange when at least a portion of the flange is spaced from the valve seat.

8. The cap of claim 1 wherein the first valve portion is defined by a duckbill valve having adjacent sidewall portions engaged with each other in a closed position and a flow path defined between at least two sidewall portions in an open position to allow fluid flow therethrough.

9. The cap of claim 1 wherein the first valve portion and second valve portion are formed in the same piece of material.

10. A cap for a vehicle fluid reservoir, comprising:
an inner cap adapted to be at least partially received within an opening of a reservoir and having a passage extending therethrough and adapted to communicate with an interior of the reservoir and a valve seat surrounding a portion of the passage;
an outer cap coupled to the inner cap to define a chamber between the inner and outer caps that communicates with the passage;
a valve located in the chamber and in communication with the passage, the valve including a first valve portion that controls fluid flow through the valve in a first direction and a second valve portion that controls fluid flow through the valve in a second direction different than the first direction, the second valve portion including a flange engageable with the valve seat to selectively permit fluid flow between the flange and the valve seat, where the first valve portion and the flange are formed in the same piece of material; and
a biasing member received within the chamber and providing a force yieldably biasing the flange into engagement with the valve seat; and
a retainer having an end wall engaged with the flange on one side and with the biasing member on its other side to transmit the force of the biasing member to the flange, and a tubular sidewall extending from the end wall to retain an end of the biasing member.

11. The cap of claim 10 wherein the first valve portion includes adjacent sidewall portions engaged with each other in a closed position and a flow path defined between at least two sidewall portions in an open position to allow fluid flow through the first valve portion.

12. The cap of claim 10 wherein the entire valve moves when the flange moves away from the valve seat to open the second valve portion.

13. The cap of claim 12 wherein the first valve portion remains closed when the second valve portion is open.

14. The cap of claim 12 wherein the second valve portion remains closed when the first valve portion is open.

15. The cap of claim 10 wherein a gap is provided adjacent to the periphery of the flange so that fluid may flow around the flange when at least a portion of the flange is spaced from the valve seat.

16. The cap of claim 15 wherein the entire valve moves relative to the valve seat to move the flange away from the valve seat.

* * * * *